TONE ARM POSITIONING MECHANISM

Filed Dec. 20, 1945 2 Sheets-Sheet 1

INVENTORS
WALTER MILLER
JAMES L. DONALDSON MORRISON
BY Fred C. Geiger
Attorney

Feb. 13, 1951 J. L. D. MORRISON ET AL 2,541,826

TONE ARM POSITIONING MECHANISM

Filed Dec. 20, 1945 2 Sheets-Sheet 2

Inventor

WALTER MILLER

JAMES L. DONALDSON MORRISON

BY J. B. Dickman Jr.

Attorney

Patented Feb. 13, 1951 2,541,826

UNITED STATES PATENT OFFICE 2,541,826

TONE ARM POSITIONING MECHANISM

James L. Donaldson Morrison and Walter Miller, Benton Harbor, Mich.

Application December 20, 1945, Serial No. 636,126

8 Claims. (Cl. 274—15)

The present invention relates to automatic adjusting means for selecting the proper place for setting down the tone arm on a record in a "drop type" record changer, in accordance with the size of a record which has last been dropped on a turntable.

There are ordinarily two sizes of records used on phonographs; ten (10) inch and twelve (12) inch. Early in the development of record changers, the tone arm set-down mechanism was adjusted manually for the size of record being used. Later, automatic adjusting devices were introduced. In the drop type record changers, a common form of these automatic devices comprised a lever which projected upwardly from the base of the phonograph and was arranged so that ten (10) inch records missed it as they dropped to the turntable, but twelve (12) inch records would strike it, whereupon the lever moved mechanism provided within the base to change the setting of the tone arm turning means from a ten (10) inch set down operation to a twelve (12) inch set down operation.

The present invention is an improvement on these automatic devices, in that the present device is entirely contained within the tone arm, and is much simpler in construction. The operation of the turning means under the base always turns the tone arm shaft to the same angular position for setting down the tone arm on a record, but if a twelve (12) inch record is dropped it strikes a feeler lever on the side of the tone arm, which operates a simple lost motion device between the tone arm and its shaft to shift the relative location of the needle just one inch radially further away from the center of the record turntable than is obtained in the normal operation for ten (10) inch records. This feeler lever is so located that a ten (10) inch record misses it and the lost motion device does not come into play, maintaining the proper set down adjustment for a ten (10) inch record.

The principal object of the present invention is to provide a sensing and adjusting mechanism contained entirely in the tone arm for properly setting down the tone arm in accordance with the size of a record being used.

Another object of the present invention is the provision of a feeler lever extending from the side of the tone arm which will be struck by a twelve (12) inch record when dropped to the turntable for changing the relative position of the needle to bring it down in the proper starting position for the twelve (12) inch record with the same angular position of the tone arm shaft as for a ten (10) inch record.

Another object of the present invention is to provide the tone arm with a lost motion device between the arm and its turning shaft for moving the relative position of the needle one inch radially further from the center of the turntable, in response to the operation of a feeler lever extending from the side of the tone arm sufficiently to be struck by a twelve (12) inch record but not by a ten (10) inch record so as to effect a proper set down location for the needle regardless of the size of a record to be played.

Other and more specific objects of this invention will become apparent as the description of an illustrative form of device made in accordance with the present invention proceeds, having reference to the accompanying drawing, wherein.

Figures 1, 2, 3, 4, 5:
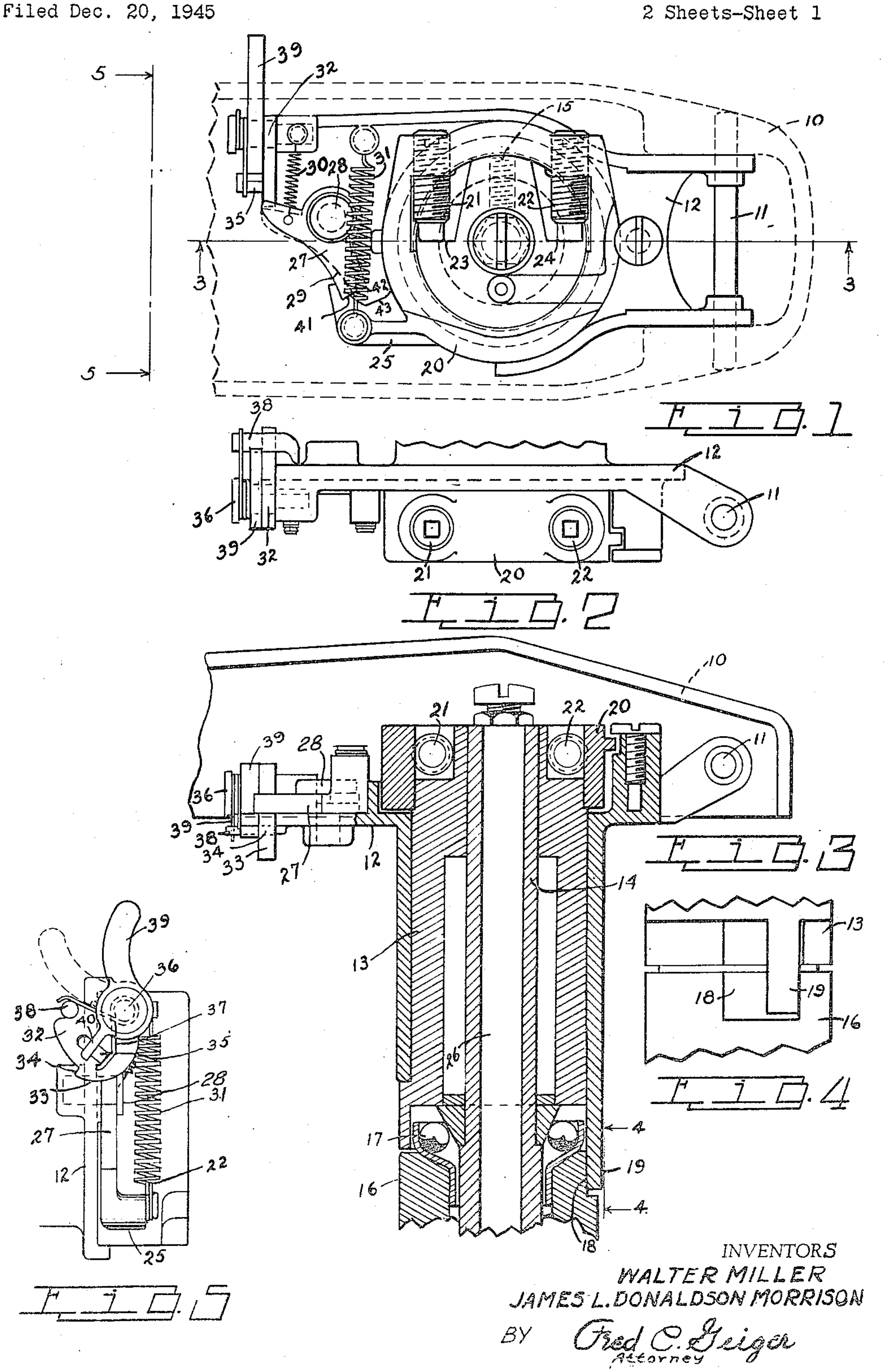
Figure 1 is a fragmentary plan view of the tone arm incorporating the present device.
Figure 2 is an inverted side view of the top of the tone arm post under the tone arm shell.
Figure 3 is a partial sectional view taken at 3—3 in Figure 1 parts being shown fragmentarily.
Figure 4 is an enlarged detail view taken at 4—4 of Figure 3.
Figure 5 is a view taken on the line 5—5 of Figure 1.
Figure 6:
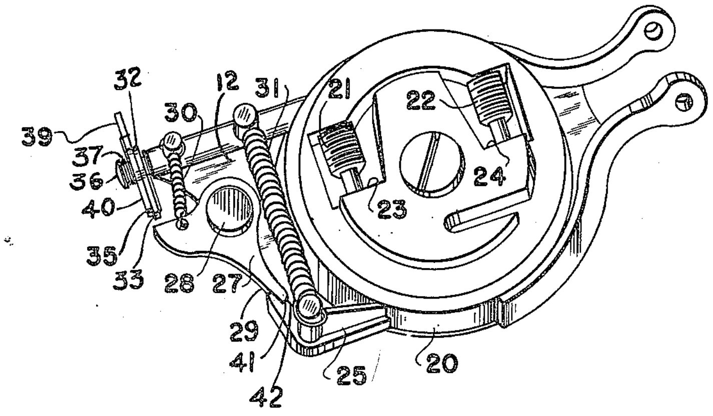
Figure 6 is a perspective view of the device showing the relation of parts providing lost motion in the mechanism between the tone arm and the tone arm post.

Referring to the drawings, the tone arm shell 10 is hingedly mounted by a pin 11 on the plate 12 which is rotatably mounted on sleeve 13 which is fixed on the hollow tone arm turning post 14 by means of a set screw 15. The sleeve and post assembly is rotatably mounted in the base 16 by means of bearing 17. The base has a cut out groove 18 and the sleeve 13 has a tongue 19 extending into the groove for limiting the turning movement of the sleeve and post assembly to a suitable range determined by the extent of the groove.

A collar 20 is adjustably mounted at the top of the sleeve 13 and has opposed adjusting screws 21 and 22 acting against opposed surfaces 23 and 24 on the sleeve 13, for relative angular adjustment between the collar and sleeve. An arm 25 extending from and fixed to the collar is connected thru a lost motion device to the plate 12, for turning the tone arm in response to turning of the post 14. A pin 26 passes through the hollow post 14 for lifting the tone arm on its hinge by mechanism operated within the base in a well.

The lost motion device connected between the plate 12 and the arm 25 comprises a bell crank 27 pivotally mounted at 28 on plate 12 and having an arm 29 normally urged by spring 30 into a position abutting the stepped portion 41 of the arm 25 to maintain the tone arm in position for operation with a 10 inch record. A spring 31 urges the arm 25 against the end of the bell crank arm 29.

A cam 32 having a cam surface 33 with a catch shoulder 34 at its end and a lug 35 turned from one of its faces, is pivoted on a pin 36 fixed to plate 12, and is urged by spring 37 into inoperative position against the pin 38. It is operated by the feeler lever 39, also pivoted on the pin 36 and having an arm 40 acting against the lug 35. The spring 37 is held in assembly by a flange on the head of pin 36, and bears against lug 35 and pin 38 to normally hold the cam 32 against the pin 38, which is fixed to plate 12. When records are removed from the turntable feeler lever 39 is free to lift up and let them pass; then to rise to the position shown in solid lines Figure 5. This is possible because feeler lever 39 is freely rotatably mounted on the pin 36, and normally assumes the position shown in full lines in Figure 5 because of the weight of its feeler causing it to keep its arm 40 up against the lug 35.

In normal operation, the cam surface 33 permits bell crank 27 to be held by its spring 30 in the position shown in full lines in Figure 1, with its arm 29 resting on the stepped portion 41 of the arm 25, which is urged against said arm by the spring 31, one end of which is attached to plate 12, the other end to arm 25. Thus a resiliently held angular relation is established between the collar 20 and plate 12. Adjusting screws 21 and 22 are used for fixing the angular relation between the collar 20 and sleeve 13 and turning post 14, which is fixed thereto by set screw 15.

The adjustment of these screws 21 and 22 is made such that the tone arm will be properly set down with respect to a 10 inch record, when the bell crank 27 and arm 25 are in the position shown in full lines.

Now, when a 12 inch record is dropped during the record changing operation, its edge strikes the feeler lever 39 which turns cam 32 until the shoulder 34 catches over the side of the arm of bell crank 27. In this operation the bell crank bar is turned to the dotted line position shown in Figure 1, where the arm 29 has been moved off the stepped portion 41 of arm 25. The stepped portion 41 is followed by an angular portion 42 and a flat portion 43.

When the pin 26 is operated to raise the tone arm off its rest and post 14 starts turning to the set down position for the tone arm, the spring 31 draws the arm 25 toward the bell crank, raising the arm 29 of the bell crank to slide down the angular portion 42 of the arm 25 and thus turn the bell crank sufficiently to release the catch shoulder 34, whereupon the cam 32 and its operating lever 39 return to their normal position. In the meantime the new angular relation between the collar 20 and plate 12, caused by the arm 29 being moved to the flat portion 43 of the arm 25, is held so as to properly position the tone arm for setting it down on the 12 inch record with the same set down angle of the turning post 14 as for a 10 inch record. In other words, the lost motion taken up angularly between the arm 25 and plate 12 due to the shift of the bell crank from the stepped portion 41 to the flat portion 43, is equivalent to a difference in set down position of the needle on the end of the tone arm of 1 inch in radial distance from the center of the turntable. Thus with the ball crank arm 29 on the flat portion 43 of arm 25 the set down operation is performed when the playing needle is an inch further away from the center of the disc for a 12 inch record than for a 10 inch record.

When a 12 inch record has been played and the record changer mechanism raises the tone arm and carries it to its outmost position the tongue 19 strikes the right end of stop groove 18, as seen in Figure 4, before the driving mechanism has stopped rotating the shaft 14 with members 13, 20 and 25. The hinge body 12 is forced to come to a stop but the collar 20 and arm 25 along the sleeve 13 continue to turn for a few more degrees until the bell crank 27 has reengaged the stepped portion 41 as a result of the tension of spring 30, the lost motion mechanism having been returned to the position required for ten inch records. The lost motion mechanism retains this relation, whereby the tone arm is brought relatively closer to the center of the turntable, until a 12 inch record is again dropped during a record changing operation, to operate the feeler arm 39, to turn the cam 32, to rock the bell crank 27 out of its locked engagement with the stepped portion 41, to permit spring 31 to move the tone arm relatively farther from the center of the turntable when the usual controls move it into starting position over the record.

Although only one form of the device constructed according to the present invention is shown, various modifications in form and arrangement of the parts may be made without departing from the spirit and scope of this invention.

What is claimed is:

1. In an automatic record changing device for normal size records, means for automatically adjusting the set down position of the tone arm for larger size records comprising, a feeler on said tone arm positioned to be struck by a larger size but not by the normal size record as it is dropped onto the turntable, and resilient means in said tone arm released by said feeler to shift the tone arm angularly on its support an amount sufficient to shift the set down position of the tone arm in accordance with the size of the larger record.

2. In an automatic record changer, a tone arm, means for automatically positioning said tone arm in proper set-down position for playing two sizes of records indiscriminately arranged in a stack, comprising a feeler mounted on said tone arm positioned so as to be struck only by a larger size record as it is moved to the turntable, means for properly positioning said tone arm for the smaller records, a lost motion mechanism in said tone arm operative angularly between said tone arm and its support, latch means for normally holding said mechanism in ineffective position, and means operated by said feeler in response to its being struck by a large record for releasing said latch means whereby to render said mechanism effective to shift said tone arm angularly with respect to its support sufficiently to shift its set-down position to match the larger record.

3. A lost-motion mechanism in a tone arm for angularly shifting said tone arm with respect to its turning post, latch means for normally maintaining said mechanism ineffective, a feeler device on said tone arm extending into the path of a large record being moved to a turntable, and means connected for operation by said feeler in response to the passing of a large record to release said latch means, and render said lost motion mechanism effective.

4. In a record changer, a turntable, a tone arm for playing two sizes of records indiscriminately arranged, said tone arm operated automatically to a normal set down position for the smaller records, a feeler on said tone arm extending into the path of the larger records when moved to said turntable, and means in said tone arm operated by said feeler for shifting the angular position of said tone arm with respect to its support to position it in proper set down position for the larger record.

5. In a tone arm operating means, a turning post for automatically positioning said tone arm, a lost motion mechanism between said post and said tone arm, latch means normally cocked for holding said lost motion mechanism against operation, and a feeler on said tone arm extending into the path of a large size record for releasing said latch means to shift the position of said tone arm in accordance with the large record.

6. In a tone arm operating means, a turning post for automatically positioning said tone arm, a lost motion mechanism between said post and said tone arm, latch means normally cocked for holding said lost motion mechanism against operation, a feeler on said tone arm extending into the path of a large size record being dropped to the turntable for releasing said latch means to shift the position of said tone arm in accordance with the large size record, and means responsive to turning movement of said turning post past the position where it moves said tone arm to a position of rest out of the way of the records for recocking said latch means.

7. In a tone arm operating means, the combination defined in claim 6, wherein said responsive means includes a stop for said tone arm operative before said tone arm turning means stops turning.

8. In a tone arm operating means, a turning post for automatically positioning said tone arm, a lost motion mechanism between said post and said tone arm, latch means normally cocked for holding said lost-motion mechanism against operation, a feeler on said tone arm extending into the path of a large size record being dropped to the turntable for releasing said latch means to shift the position of said tone arm in accordance with the large size record, and means responsive to movement of said tone arm operating means to turn said tone arm clear of said turntable to recock said latch means.

W. MILLER.
JAMES L. DONALDSON MORRISON.

REFERENCES CITED

The following references are of record in the file of this patent:

UNITED STATES PATENTS

| Number | Name | Date |
|---|---|---|
| 1,538,667 | Smith | May 19, 1925 |
| 2,017,898 | Gates | Oct. 22, 1935 |
| 2,043,789 | Ansley | June 9, 1936 |
| 2,291,158 | Holstensson | July 28, 1942 |
| 2,398,010 | Johnson | Apr. 9, 1946 |